A. J. PATCH.
DIFFERENTIAL GEARING.
APPLICATION FILED JAN. 22, 1914.
1,123,582.
Patented Jan. 5, 1915.
2 SHEETS—SHEET 1.
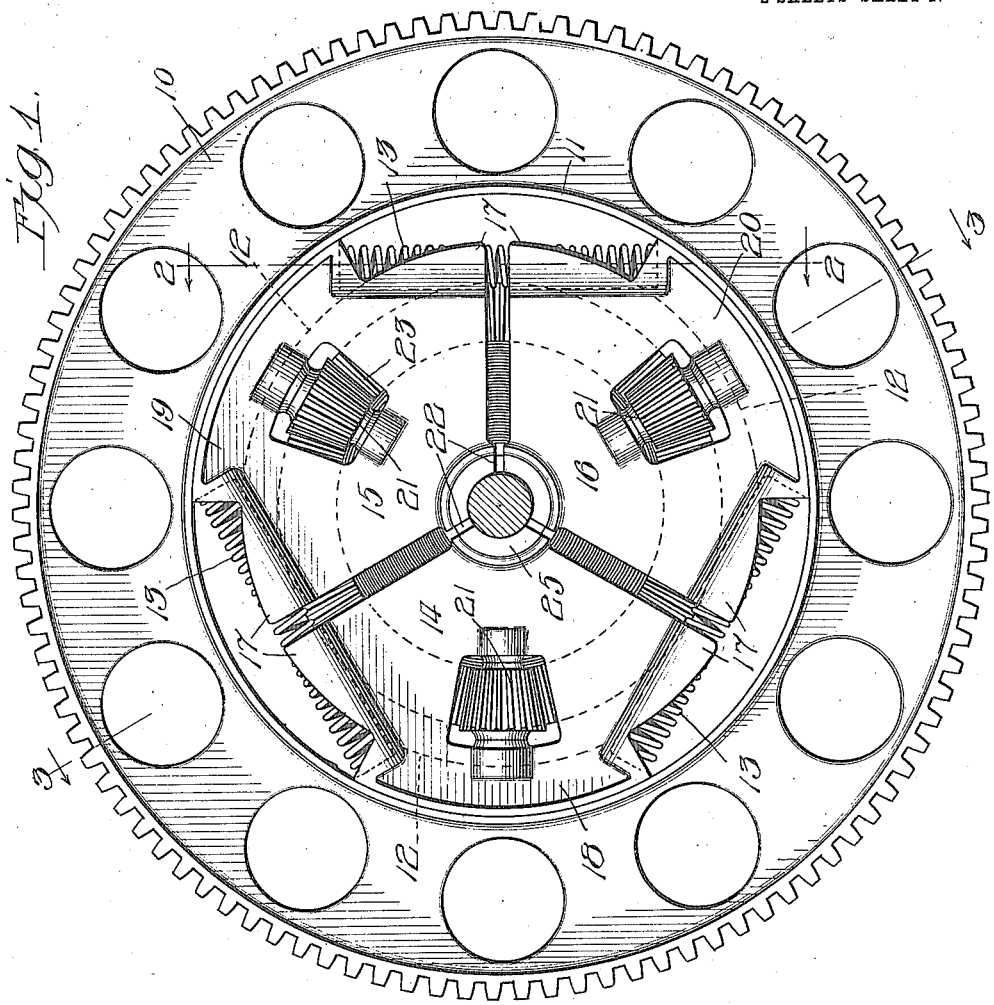
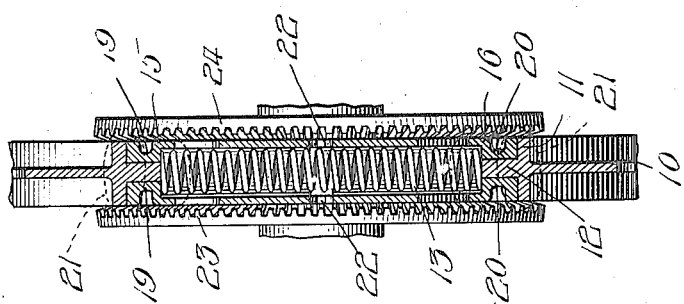

A. J. PATCH.
DIFFERENTIAL GEARING.
APPLICATION FILED JAN. 22, 1914.
1,123,582.
Patented Jan. 5, 1915.
2 SHEETS—SHEET 2.
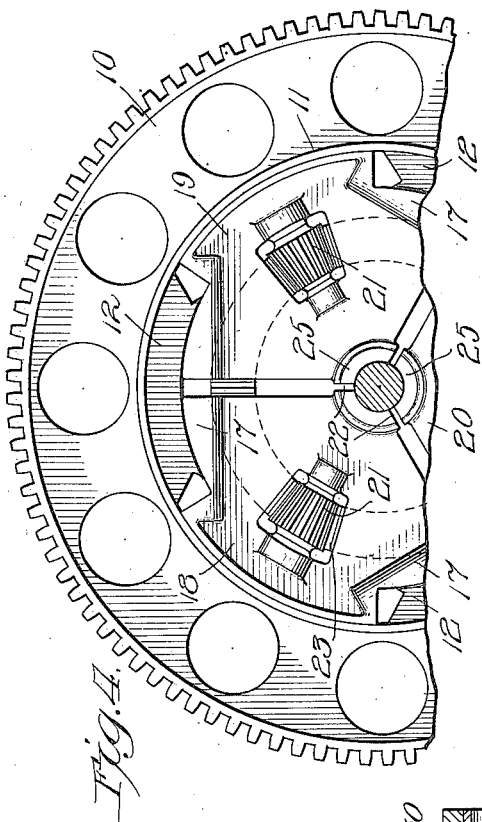
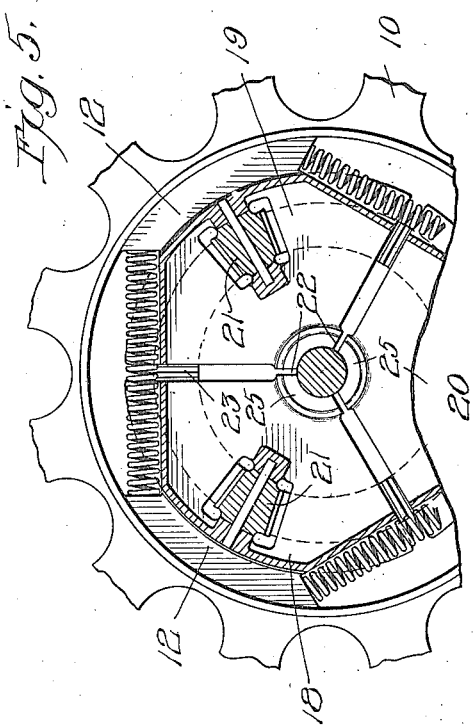
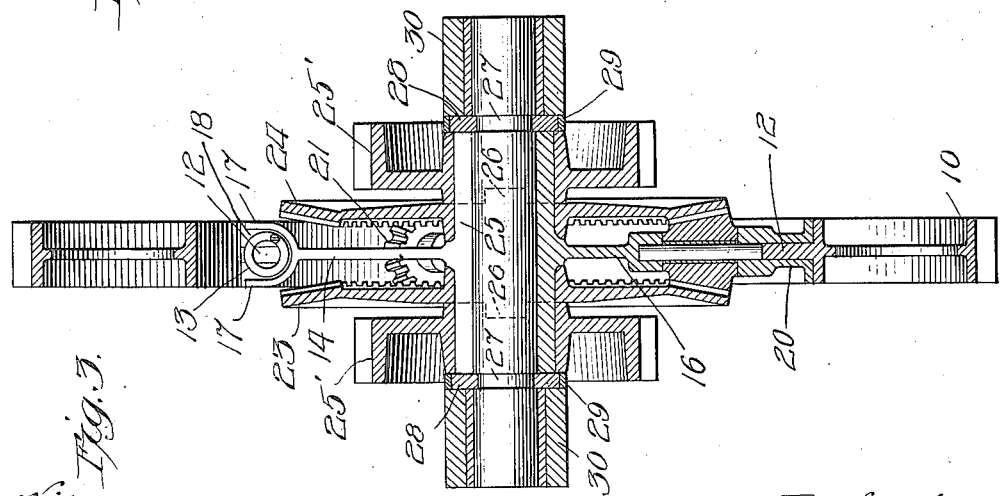
Witnesses:
Harry S. Gaither
M. E. Martin
Inventor:
Allen J. Patch
by Arba B. Marvin
Atty

UNITED STATES PATENT OFFICE.

ALLEN J. PATCH, OF OSHKOSH, WISCONSIN.

DIFFERENTIAL GEARING.

1,123,582.  Specification of Letters Patent.  Patented Jan. 5, 1915.

Application filed January 22, 1914. Serial No. 813,640.

*To all whom it may concern:*

Be it known that I, ALLEN J. PATCH, a citizen of the United States, residing at Oshkosh, in the county of Winnebago and State of Wisconsin, have invented new and useful Improvements in Differential Gearing, of which the following is a specification.

It is the object of the present invention to provide a differential gearing suited for use in a great variety of ways for the transmission and distribution of power, the structure as a whole comprising resilient connection through which the power is transmitted, this connection serving to cushion the action of the gearing and to relieve the mechanism from shock and sudden strain.

It is a further object of the present invention to provide such yielding relation between certain of the power transmitting members or gears that any mechanical inequality in angular position or relative action, such as might result from continued wear, heavy service, or inaccurate workmanship will be compensated for through slight shifting of one element with respect to the other, thereby equalizing the load on all of the corresponding parts, irrespective of their exact location with respect to one another.

A further object is to provide a structure which can be taken apart easily for repair and which is relatively free from bolts, rivets and fastening devices, which might become loosened or displaced in service. The structure as a whole locks together into a complete mechanism but in such a way as to permit of easy dismantling when desired.

In the accompanying drawings forming a part of this specification, Figure 1 is an end elevation of the gearing with one of the large side gears removed to expose the three bevel pinions, with which it meshes. Fig. 2 is a section on the line 2—2 of Fig. 1 and shows the mounting of one of the three driving springs. Fig. 3 is a transverse section through the gearing of Fig. 1 on the line 3—3. Fig. 4 illustrates the relative position of the several parts when the gearing is being put together or taken apart and before the driving and retaining springs have been inserted, and Fig. 5 is a sectional elevation through the central portion of the gearing showing the coöperative action of the three retaining springs when the parts are in their working relation.

In the embodiment here illustrated, the gearing as a whole comprises an outer ring 10 which may be the driving member, having gear teeth on its periphery and having around its inner edge a flange 11 from which project inward three lugs or webs 12, each having a circumferential length somewhat less than one-sixth of the total inner circumference of the ring. These lugs are the agencies through which power is delivered from the ring, through the springs and to the bevel pinions.

Three springs 13 are disposed, as shown in Fig. 5, with their ends bearing directly against adjacent ends of lugs 12 and it is through these springs that the power is transmitted from the lugs to members supporting bevel pinions. Each spring 13 is seated in a pocket and extends across one of the gaps, which separate the three sectoral elements 14, 15 and 16, which make up the central or hub portion of the gearing. Each sectoral element has projecting flanges 17 forming a pocket for the reception of a spring 13 and in addition, these sectoral elements are provided respectively with lugs or webs 18, 19 and 20, grouped in pairs, arranged on both sides of the lugs 12 and having their ends shaped to receive and press against the end of the adjacent coiled spring 13. When the sectoral elements are driven, as hereinafter disclosed, they shift with respect to the outer ring 10, slipping their webs or lugs 18, 19 and 20 with respect to the lugs 12 of the ring and so compressing springs 13 and receiving a driving impulse through these springs from the outer ring.

The means used for delivering power from the sectoral elements 14, 15 and 16 which make up the hub portion of the gearing, preferably comprise a plurality of bevel pinions 21, uniformly distributed, one in the middle of each sector and each mounted in usual manner to turn freely on its own axis, whether or not it is receiving a driving impulse from its supporting sector. Each of the sectors 14, 15 and 16 is spaced apart from its adjacent sectors by gaps 22, so that there may be some slight angular shifting of the bevel pinions 21 with respect to one another and such shifting, when it occurs, will distribute the load through the springs equally on said three pinions, so that each pinion and each of the springs 13, will be doing its proportionate share of the work. This automatic equalization in the load on the three pinions, irrespective of slight irregularities in size or in wear or in position, is an important feature of my invention as here disclosed, and this feature in conjunction with the resilient connection between these beveled pinion supports 21 and the outer ring 10, give to the structure as a whole, a reliability and smoothness of action, highly desirable in this class of gearing.

The bevel pinions 21 drive two bevel gears 23 and 24 (Fig. 3) arranged one on either side of the bevel pinions and both meshing with all the pinions and being rotated by those pinions in usual manner. These bevel gears 23 and 24 are preferably mounted to turn on the hub flanges 25 of the sectoral elements 14, 15 and 16 and even though these hub flanges are discontinuous, because of the gaps 22, they afford an adequate seat on which these gears may rotate.

At the side of each bevel gear 23 and 24 is a toothed pinion 25, which may be cast integral with the bevel gear, but which for convenience may be made separate therefrom but locked in driving relation therewith by a tongue and slot 26, as shown in Fig. 3.

As a means for holding the bevel gears and their coöperating pinions 25' in driving relation to the three bevel pinions 21 and to take the end thrust of the bevel gears, the supporting shaft is provided with an annular groove 27 in which is seated a split ring 28, over which is slipped a retaining band or ring 29 which completely encircles the split ring and holds its two halves in place. The split ring coöperating with the shaft, takes the end thrust of its adjacent gearing and the band 29 keeps the split ring in position. The shaft bearings 30 are easily removable from the shaft and then by slipping ring 29 lengthwise of the shaft, the split ring 28 can be taken out and the adjacent gear 25' and its bevel gear 24 will then be released and can be slipped off over the end of the shaft. To dismantle the others, it is only necessary to pry the springs 13 up out of their pockets over the retaining flanges 17 and then the outer ring 10 can be swung around until its lugs 12 come out from between the coöperating lugs or flanges on the sectoral members. This brings the parts into the relative positions illustrated in Fig. 4. The ring 10 can then be moved sidewise away from the sectors, which thereupon are released and can be pulled away from bevel gear 23 to complete the dismantling.

The entire structure is put together without any bolts or studs as retaining members and the three large springs used for distributing the power from the segments to the tooth ring, serve as retaining members in addition to their functions of equalizing the load on the three pinions and of protecting the entire gearing from shock when the load varies. No one pinion can take more than its share of the load, for any tendency toward unequal distribution will be equalized immediately, by a corresponding shift in the spring controlled sectors, whereon those gears are mounted.

The differential gearing forming the subject of the present invention, may be used in tractor engines, in automobiles, in heavy power transmission and in the mechanical arts generally and can be used in place of differential gearing heretofore employed, wherein the advantages above set forth and inherent in applicant's structure, have not heretofore been found.

In the particular embodiment here disclosed, various parts may be altered or replaced and the size and proportion and details of the several parts may be changed without departing from the spirit of my invention as defined by the appended claims.

I claim:

1. In a differential gearing, the combination of a pair of bevel gears, a plurality of bevel pinions therebetween, and supporting means for said pinions permitting variation in relative angular position thereof.

2. In a differential gearing, the combination of a pair of bevel gears, a plurality of bevel pinions therebetween, supporting means for said pinions permitting variation in relative angular position thereof, a driving member and resilient driving connections between said driving member and each of the members supporting said pinions.

3. In a differential gearing, the combination of a driving member, a plurality of pinions, supporting means for said pinions permitting variation in relative angular position thereof, springs operatively connecting each pinion support with said driving member, and a pair of gears meshing with said pinions.

4. In a differential gearing, the combination of a pair of bevel gears, a plurality of bevel pinions therebetween, supporting means for said pinions permitting relative movement thereof, a toothed member encircling said pinions, and resilient driving connections between said toothed member and the supporting means of said pinions.

5. In a differential gearing, the combination of a toothed ring, a plurality of beveled pinions encircled by said ring, supporting means for said pinions permitting relative movement thereof, springs operatively connecting each pinion support with said toothed ring, and a pair of bevel gears meshing with said pinions and rotating their supports in proportion to differences in speed between the bevel gears.

6. In a differential gearing the combination of a toothed ring member having lugs, a plurality of coiled springs bearing against said lugs to transmit power from said toothed ring, sectoral members positioned within said ring a bevel pinion carried by each sectoral member, each of said sectoral members being capable of movement with respect to the other sectoral members and having driving engagement with one of said springs, and a pair of bevel gears embracing said bevel pinions for differential rotation thereby.

7. In a differential gearing, the combination of a pair of spur gears, a bevel gear for each of said spur gears and turning therewith, sectoral members positioned between said beveled gears and movable relative to one another, a bevel pinion on each sectoral member positioned between said bevel gears and meshing therewith, a ring encircling said sectoral members and having lugs serving as spring seats, and a plurality of springs on said seats and operatively engaging said sectoral members to yieldingly transmit power between the ring and the beveled pinions.

8. In a differential gearing, the combination of a member having inwardly projecting lugs serviceable as seats for springs, a plurality of sectoral members encircled by said ring, a bevel pinion carried by each of said sectoral members, a plurality of springs engaging the seats of said ring and operatively engaging said sectoral members, the latter being shaped to form pockets in which said springs are seated, and bevel gears meshing with each of said pinions.

9. In a differential gearing, the combination of a shaft having annular grooves, split rings seated in said grooves, encircling bands for each of said rings, pinions held against longitudinal movement by said split rings, bevel gears mounted to turn with said pinions, sectoral members having segmental hubs whereon said bevel gears may rotate, a bevel pinion mounted to turn in each sectoral member, said pinions having movement relative to one another, coiled springs seated in said sectoral members and a ring member having inwardly projecting lugs for engagement with said springs whereby power may be transmitted through the springs from the ring member and whereby the load on any one pinion may be equalized by movement of that pinion with respect to its companion pinions.

In witness whereof, I hereunto subscribe my name to this specification in the presence of two witnesses.

ALLEN J. PATCH.

Witnesses:
H. M. JOHNSON,
L. S. PORTER.